United States Patent
Ohnemus et al.

(10) Patent No.: US 10,272,762 B2
(45) Date of Patent: Apr. 30, 2019

(54) ELECTRIC DRIVE SYSTEM

(71) Applicant: Bayerische Motoren Werke Aktiengesellschaft, Munich (DE)

(72) Inventors: Ulrich Ohnemus, Hattenhofen (DE); Michael Etzel, Munich (DE); Benjamin Kluge, Munich (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/831,494

(22) Filed: Dec. 5, 2017

(65) Prior Publication Data
US 2018/0093558 A1 Apr. 5, 2018

Related U.S. Application Data

(63) Continuation of application No. PCT/EP2016/066270, filed on Jul. 8, 2016.

(30) Foreign Application Priority Data

Jul. 24, 2015 (DE) .......................... 10 2015 214 041

(51) Int. Cl.
*B60K 6/365* (2007.10)
*B60K 6/387* (2007.10)
(Continued)

(52) U.S. Cl.
CPC .............. *B60K 6/365* (2013.01); *B60K 6/387* (2013.01); *B60K 6/40* (2013.01); *B60K 6/405* (2013.01);
(Continued)

(58) Field of Classification Search
CPC .......... B60K 6/365; B60K 6/387; B60K 6/40; B60K 6/405; B60K 6/48;
(Continued)

(56) References Cited

U.S. PATENT DOCUMENTS

| 8,480,525 B2 * | 7/2013 | Reichert | B60K 6/40 475/5 |
| 8,490,727 B2 * | 7/2013 | Borntrager | B60K 6/387 180/65.22 |
| 2009/0050384 A1 | 2/2009 | Muller et al. | |
| 2011/0100736 A1 | 5/2011 | Borntrager et al. | |
| 2011/0224043 A1 | 9/2011 | Bachmann et al. | |
| 2012/0220403 A1 | 8/2012 | Reichert et al. | |

FOREIGN PATENT DOCUMENTS

| DE | 10 2007 036 098 A1 | 2/2009 |
| DE | 10 2008 040 497 A1 | 1/2010 |

(Continued)

OTHER PUBLICATIONS

International Search Report (PCT/ISA/210) issued in PCT Application No. PCT/EP2016/066270 dated Oct. 25, 2016 with English translation (six pages).

(Continued)

*Primary Examiner* — John D Walters
(74) *Attorney, Agent, or Firm* — Crowell & Moring LLP

(57) ABSTRACT

A drive system for a hybrid drive in a motor vehicle is provided. The drive system includes a drive machine with a rotor and a stator; a planetary gear set with a sun gear, a ring gear and at least one planetary gear mounted on a planetary carrier; and a coupling system, by way of which at least one other drive machine can be coupled to the drive system. The ring gear can be connected to the rotor in order to transmit drive power and is arranged inside the rotor in the radial direction. In particular, the sun gear of the drive system is non-rotatably mounted in relation to the stator; the planetary carrier is configured as a transmission output shaft; and a power take-off shaft, which is concentric with the ring gear, can be connected to the planetary carrier and to the coupling system.

20 Claims, 3 Drawing Sheets

(51) Int. Cl.
  *B60K 6/405* (2007.10)
  *B60K 6/48* (2007.10)
  *B60K 6/40* (2007.10)

(52) U.S. Cl.
  CPC ........ *B60K 6/48* (2013.01); *B60K 2006/4825* (2013.01); *B60K 2006/4833* (2013.01); *Y02T 10/6221* (2013.01); *Y02T 10/6252* (2013.01)

(58) Field of Classification Search
  CPC .... B60K 2006/4825; B60K 2006/4833; Y02T 10/6221; Y02T 10/6252
  USPC ....................................................... 180/65.6
  See application file for complete search history.

(56) References Cited

FOREIGN PATENT DOCUMENTS

| | | |
|---|---|---|
| DE | 10 2008 043 290 A1 | 5/2010 |
| DE | 10 2009 046 366 A1 | 5/2011 |
| DE | 10 2010 063 580 A1 | 6/2012 |

OTHER PUBLICATIONS

German-language Written Opinion (PCT/ISA/237) issued in PCT Application No. PCT/EP2016/066270 dated Oct. 25, 2016 (six pages).
German-language Office Action issued in counterpart German Application No. 10 2015 214 041.5 dated Mar. 21, 2016 (four pages).

* cited by examiner

ELECTRIC DRIVE SYSTEM

CROSS REFERENCE TO RELATED APPLICATIONS

This application is a continuation of PCT International Application No. PCT/EP2016/066270, filed Jul. 8, 2016, which claims priority under 35 U.S.C. § 119 from German Patent Application No. 10 2015 214 041.5, filed Jul. 24, 2015, the entire disclosures of which are herein expressly incorporated by reference.

BACKGROUND AND SUMMARY OF THE INVENTION

The invention relates to an electric drive system for a hybrid drive in a motor vehicle. Such drive systems are known from the prior art, in particular, DE 10 2008 043 290 A1.

The invention will be described hereinafter on the basis of the example of a hybrid drive including an internal combustion engine and an electric motor/generator (electromechanical energy converter). However, this is not to be understood as a restriction of the invention.

In such hybrid drives, the electric motor is frequently used for the drive of the vehicle from standstill. In order to not have to use a very large and heavy electric motor in this range at low speeds, the electric motor is coupled by way of a transmission to the drive train. At high velocities of the vehicle and therefore high speeds in the drive train, the electric motor is strongly stressed, in particular, by the centrifugal forces.

DE 10 2008 043 290 A1 proposes a hybrid module, in which the rotor of the electromechanical energy converter is coupled to the ring gear of a planetary transmission. Furthermore, this planetary transmission is arranged inside the rotor in the radial direction. A clutch is provided for connecting the internal combustion engine to the planetary gear carrier of this planetary transmission.

It is an object of the invention to provide a drive system for a hybrid drive having improved topology.

A drive system for a hybrid drive in a motor vehicle according to an embodiment of the invention has a drive machine including a rotor and a stator, in particular an electromechanical energy converter. Furthermore, the drive system has a planetary gear set including a sun gear, a ring gear, and at least one planetary gear mounted on a planetary gear carrier. A plurality of planetary gears is preferably mounted on the planetary gear carrier, preferably three or more and particularly preferably five or more.

Furthermore, the drive system has a coupling device for selectively establishing a torque-conducting connection. By way of the torque-conducting connection, a drive power is transmittable to the drive system, preferably on a drive shaft, in particular from a further drive machine, preferably an internal combustion engine.

The ring gear is preferably connectable to the rotor to transmit a drive power and is arranged in the radial direction inside the rotor.

According to an embodiment of the invention, the sun gear is mounted in a rotationally-fixed manner in relation to the stator and the planetary gear carrier is configured as a transmission output shaft or is connectable with a transmission output shaft. And furthermore the drive shaft, which is arranged concentrically in relation to the ring gear, is preferably connectable to the coupling device and the planetary gear carrier. The planetary gear carrier is preferably mounted, preferably directly, in the transmission housing. Furthermore, the rotor of the drive machine is preferably mounted on the planetary gear carrier. Preferably, it is achievable, using such a mounting, that an air gap between the rotor and the stator of the drive machine is particularly small and therefore a high efficiency is achievable therewith.

In a preferred embodiment, the ring gear is connected in a rotationally-fixed manner to the rotor and the planetary gear carrier is rotatably mounted in relation to the ring gear. At least one roller bearing, preferably multiple roller bearings, is preferably provided for mounting the planetary gear carrier. A particularly space-saving construction of the drive system is enabled in particular by such a topology.

Furthermore, the coupling device, with respect to the torque transmission between the further drive machine and the drive shaft, is preferably arranged so that the power transmission to the drive system from the further drive machine can be selectively interrupted.

In a preferred embodiment of the invention, the drive shaft is connected in a rotationally-fixed manner to the planetary gear carrier, preferably formed in one piece therewith. The drive shaft is preferably connected in a form-fitting manner, preferably in a friction-locked manner, and particularly preferably in an integrally-joined manner or furthermore preferably using a combination of at least two of the mentioned types, to the planetary gear carrier. In particular, by way of a torque-conducting connection of the planetary gear carrier to the drive shaft, the drive power from the drive machine and the further drive machine can be added thereon, and can be output therefrom to the further drive train, in particular an input shaft in a shift transmission device.

In a preferred embodiment, the stator of the drive machine is accommodated in a housing module and connected in a rotationally-fixed manner thereto. The stator is preferably connected in a form-fitting manner, preferably in a friction-locked manner, and particularly preferably in an integrally joined manner to the housing module and furthermore preferably using a combination of at least two of the mentioned connection types.

In a preferred embodiment, the sun gear is connected in a rotationally-fixed manner to the housing module. The sun gear is preferably connected by way of an intermediate element, preferably by way of a shaft, preferably by way of a hollow shaft, or particularly preferably by way of an intermediate wall and preferably by way of a support cover to the housing module. Furthermore, the sun gear is preferably connected to the housing module in a form-fitting manner, preferably in a friction-locked manner, and particularly preferably in an integrally-joined manner and furthermore preferably using a combination of at least two of the mentioned connection types.

In a preferred embodiment, the planetary gear set is designed as a plus transmission, preferably as a minus transmission. The planetary gear set preferably has a stand transmission ratio, the absolute value of which is greater than 1, preferably greater than 1.25, and preferably greater than 1.5 and furthermore is less than 2.5, preferably less than 2.1, and preferably less than 1.8 and very particularly preferably the absolute value of this stand transmission ratio, at least substantially, is 1.65. "At least substantially" in this meaning is to be understood as a range of +/−0.25, preferably +/−0.15, and particularly preferably +/−0.05. Experiments have shown that such planetary gear sets fulfill the requirements for hybrid drives particularly well.

The stand transmission ratio of the planetary gear set, i.e., in particular the tooth count ratio of ring gear/sun gear, is preferably at least substantially −1.6, or the absolute value thereof is 1.6. Furthermore, this preferably results in a transmission ratio of the planetary gear set having stationary sun gear of, at least substantially, 1.625.

In a preferred embodiment, the housing module is designed as a transmission housing for accommodating multiple shift transmission stages. Such a transmission housing is preferably to be understood as the transmission housing of an automatic transmission or preferably an automated or manual shift transmission. Furthermore, the drive module or the drive system, respectively, can thus be integrated in an existing transmission housing.

The housing module is preferably designed as a separate component in relation to a transmission housing of the above-described type. Furthermore, the housing module and the transmission housing are preferably connectable to each other in a separable manner, preferably by way of a rivet connection, preferably by way of a screw connection.

In a preferred embodiment, the coupling device is arranged radially inside the rotor. The coupling device is preferably designed as a laminar clutch, furthermore, the outer laminae are preferably at least connectable or preferably connected to the planetary gear carrier.

The coupling device is preferably closed fluid-tight in relation to the planetary gear set and furthermore the coupling device is preferably designed as a dry-running coupling device and preferably as a dry-running laminar clutch. A dry-running coupling device is preferably mounted upstream in the axial direction from the planetary gear set. The coupling device, preferably at least one torque transmission region thereof, is preferably arranged geometrically on the side of the further drive machine and upstream of the planetary gear set, preferably between them.

A further coupling device is preferably provided on the drive system, which is preferably arranged on the side of the drive system facing away from the further drive machine. Furthermore, this further coupling device is preferably configured for selective transmission of drive torque from the drive shaft (planetary gear carrier) to a further drive train. This further coupling device is preferably designed as a friction clutch, preferably as a laminar clutch, preferably as a hydraulic torque converter, preferably having torque converter lockup. Furthermore, this further coupling device is preferably designed for implementing the starting function.

The torque transmission range is to be understood, according to an embodiment of the invention, as the range of the coupling device which is configured for the selective torque transmission.

A particularly space-saving construction of the drive system is enabled in particular by a coupling device designed in this manner.

The coupling device is furthermore preferably designed as a wet-running coupling device and furthermore the coupling device is preferably arranged in the same wet chamber as the planetary gear set. In this case, the same wet chamber is to be understood to mean that the coupling device and the planetary gear set are arranged in the same, or in a coherent or uninterrupted, respectively, geometric chamber, so that in particular the same lubricant can flow through them. Furthermore, this lubricant is preferably provided for the temperature control, in particular the cooling, of the rotor.

In a preferred embodiment, at least one partial region and preferably the entire region for selective torque transmission (torque transmission region) of the coupling device is arranged in the axial direction inside the rotor. The coupling device, but preferably at least the components which participate in the selective torque transmission, is preferably at least partially, but preferably completely covered by the rotor.

In this meaning, the components participating in the selective torque transmission are to be understood as the components which are in contact for the selective torque transmission and are not in contact in the case in which no torque is transmittable using the coupling device. Furthermore, the friction laminae and the components participating in the selective torque transmission are preferably to be understood with respect to a laminar clutch and the claws are to be understood with respect to a claw clutch. Furthermore, the coupling device is preferably spatially situated between the further drive machine and the planetary gear set. A particularly space-saving construction of the drive system is enabled in particular by such a design.

In a preferred embodiment, the planetary gear set is at least partially arranged inside the rotor with respect to the axial extension. The ring gear, the sun gear, and at least the one planetary gear are preferably arranged in the axial direction inside the rotor. The width of these gearwheels is preferably predefined, in particular by the toothed region thereof, which is intended for power transmission, and preferably at least this toothed region is arranged at least partially and preferably completely in the axial direction inside the rotor. Furthermore, an increase of the number of the planetary gears preferably results in particular in a parallel power transmission between the sun gear and the ring gear, and the structural length of the drive system can be reduced by an increase of the number of the planetary gears.

The drive system is combinable with at least one further drive machine, preferably an internal combustion engine, to form a hybrid drive train. This hybrid drive train preferably has a transmission device having multiple shift gear stages. A drive power, which can be supplied from the drive machine or the further drive machine into the drive system, can preferably be emitted by the planetary gear carrier to the transmission device, in particular by way of the further coupling device. Furthermore, this drive power can preferably be transmitted from the transmission device in the direction toward a drivable wheel tire of the motor vehicle. The vehicle preferably has two or more drivable wheel tires. A wheel tire is to be understood in particular as a drivable wheel of the vehicle having a tire. The shift transmission device is preferably arranged downstream of the drive system with respect to the torque transmission from the drive machine to this drivable wheel tire.

In a preferred embodiment, the transmission device is designed as an automated or automatically shifting transmission device. Furthermore, this transmission device preferably has one, preferably two, and preferably three or more planetary gear sets having a plurality of shift gears. This transmission device preferably has four shift gears, preferably five, particularly preferably six, and very particularly preferably seven or more gears. Furthermore, these gears are preferably producible by selective connections between individual elements of the planetary gear sets.

Furthermore, the drive machine, thus preferably the electromechanical energy converter, can preferably be accommodated in the transmission housing of this transmission device, so that the housing module is connected in one piece to the transmission housing.

The housing module of the drive machine is preferably connectable to the transmission housing of this transmission device, so that the housing module is connected as a separate component to the transmission housing. The housing module is preferably connectable in a form-fitting manner to the transmission housing, furthermore it is preferably screwed thereon.

Due to an embodiment of a drive system in the described manner, i.e., in particular the integration of the planetary gear set between the rotor of the drive machine designed as an electromechanical energy converter and a transmission input to the shift transmission device, it is achievable in particular that the structural space is reduced, with simultaneous torque increase of the drive machine designed as a high-speed electromechanical energy converter.

Furthermore, in particular a reduction of an input speed into the shift transmission device during the drive via the drive machine, so-called "edriving" with high-speed drive machine, is achievable and therefore in particular an efficiency advantage in the transmission device is achievable.

Furthermore, in particular a reduction of the input speed in "edriving" is achievable using a high-speed drive machine and therefore in particular a rapid and comfortable load takeover by the further drive machine (internal combustion engine) is achievable, in particular upon activation request. Moreover, in particular, a traction-neutral upshift is feasible upon activation of the further drive machine, in the case of activation decision in the range of the power hyperbola of the drive machine-torque-speed characteristic curve.

In addition, in particular superior "edriving" is feasible, since the drive machine is operable in particular with maximum power upon load request from constant travel, in particular without a downshift (shift from gear n to gear n–1) in the transmission device being necessary for this purpose.

Furthermore, this enables in particular the operating ranges of the drive machine preferably to be improved for recuperative operation (brake energy reclamation) or for a load point increase of the further drive machine, respectively.

Moreover, in particular a preferably active or preferably passive reduction of torque irregularities, as can be applied by the further drive machine to the drive system, is achievable by the drive machine.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
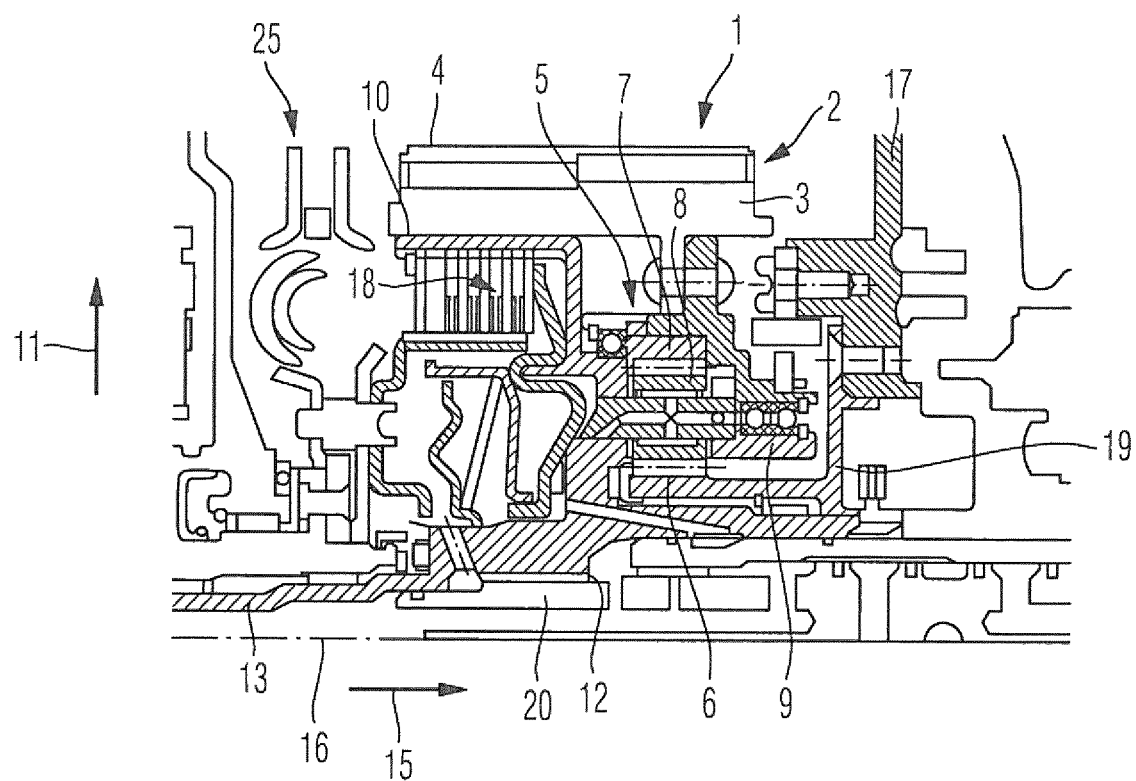
FIG. 1 is a sectional view of a first variant of the drive system.

FIG. 1 shows a drive system 1, in which a planetary gear set 5 is integrated between an electric motor/generator 2 and a transmission input shaft 13 into an automatic transmission (not shown). In this case, the planetary gear set 5 has a sun gear 6, a ring gear 7, and a plurality of planetary gears 8, which are rotatably mounted on the planetary gear carrier 9. The rotor 3 is mounted in such a way that it is rotatable in relation to the planetary gear carrier 9, or thereon, respectively.

The sun gear 6 is connected in a rotationally-fixed manner to the housing module 17 via an intermediate wall 19, which is designed as a so-called support cover, and therefore the speed zero is specified for this sun gear. The planetary gear carrier 9 is rotatably mounted in relation to the housing module 17 and the intermediate wall 19. The drive power supplied to the planetary gear set 5 via the electric motor/generator 2 can be output via the planetary gear carrier 9 to the transmission input shaft 20. The transmission input shaft 20 supplies this drive power to an automatic transmission (not shown). The transmission input shaft 20 is connected in a form-fitting manner to the drive shaft 13 and therefore a particularly low-loss power transmission is enabled from the internal combustion engine to the transmission input shaft 20. The drive shaft 13, the transmission output shaft 12 and the planetary gear carrier 9 are formed in one piece with one another.

The drive system 1 has a coupling device designed as a laminar clutch 10. A drive torque from the internal combustion engine is transmitted in such a laminar clutch 10 by friction laminae in the torque transmission region 18. An internal combustion engine (not shown), as a further drive machine, is connected to the coupling device 10 by way of a device for reducing rotational irregularities 25.

The planetary gear set 5 is arranged completely inside the rotor 3 in the radial direction 11. The coupling device 10 is also arranged completely inside the rotor 3 in the radial direction 11.

In the axial direction 15, the planetary gear set 5 is also completely covered by the rotor 3, i.e., arranged completely inside the rotor 3. The laminar clutch 10, but at least the torque transmission region 18, is also arranged completely inside the rotor 3, with respect to the axial extension 15.

The drive shaft 13 and the rotor 3, the ring gear 7, the planetary gear carrier 9, the sun gear 6, and the transmission input shaft 20 are arranged concentrically to the central transmission axis 16.

By specifying the speed for the sun gear (speed=0), the ring gear 7 and the planetary gear carrier 9 remain as free shafts of the planetary gear set 5. If the drive system 1 is driven via the electric motor 2, drive power is supplied to the planetary gear set 5 via the ring gear 7 and it emits this power via the planetary gear carrier 9.

Figure 2:
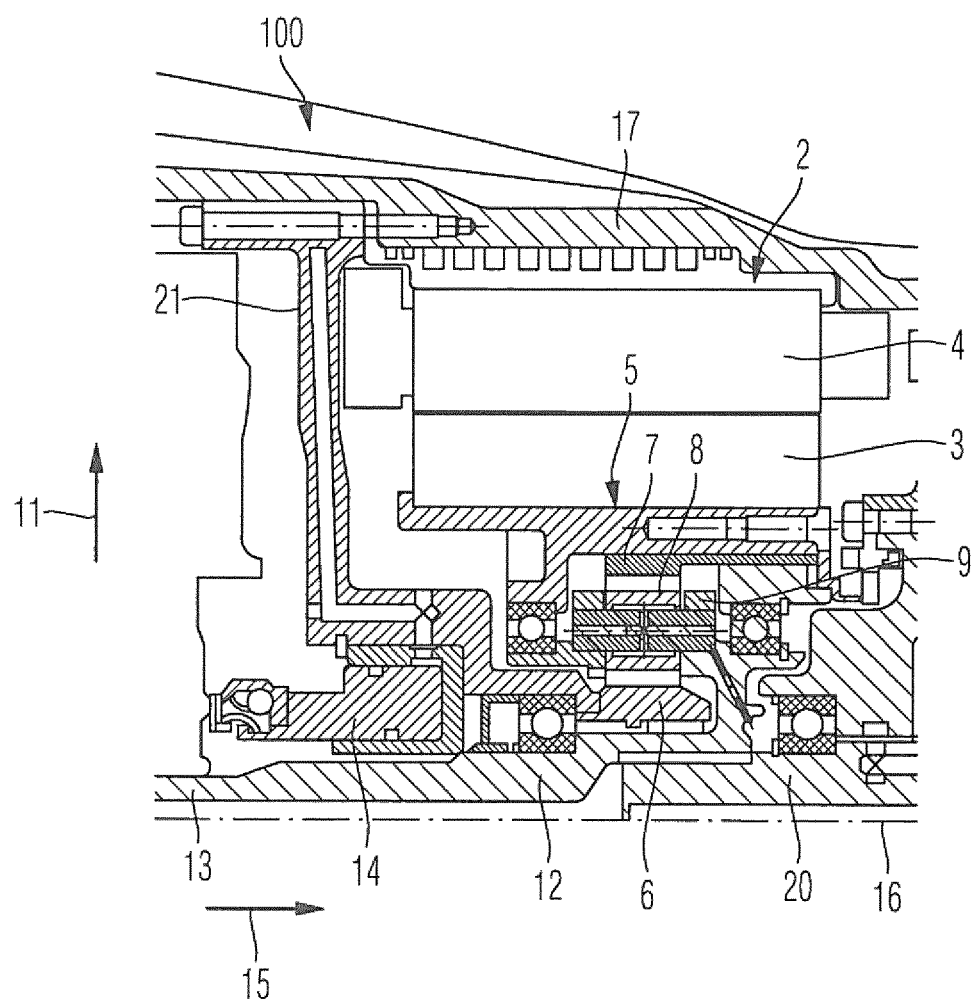
FIG. 2 is a sectional view of a second variant of the drive system.

FIG. 2 shows a further variant of a drive system 100. The electric motor 2 is accommodated in a housing module 17. In this case, the stator 4 is connected in a rotationally-fixed manner to the housing module 17. The rotor 3 is rotatably mounted in relation to the stator 4. The sun gear 6 is connected in a rotationally-fixed manner to the housing module 17 (speed specification=0). The rotor 3 is rotatably mounted on the planetary gear carrier 9. The planetary gears 8 are rotatably mounted on the planetary gear carrier 9.

The drive shaft 13 and the ring gear 7, the planetary gear carrier 9, and the rotor 3 are arranged concentrically to the central transmission axis 16. The coupling device (not shown) is operable by the central ejector 14 and therefore drive power can be supplied selectively from the internal combustion engine to the transmission input shaft 20. Furthermore, it is also made possible, in particular for a starting procedure of the internal combustion engine, to supply a drive power selectively to the internal combustion engine (not shown) from the rotor 3 via the coupling device (not shown). The electric motor/generator 2 encloses the planetary gear set 5 in the radial direction 11. The ring gear 7 is connected in a rotationally-fixed manner to the rotor 3.

The rotor 3 is rotatably mounted on the planetary gear carrier 9. The transmission input shaft 20 is connected in a form-fitting manner to the drive shaft 13 and/or to the planetary gear carrier 9 and therefore to the transmission output shaft 12 and thus in particular a particularly low-loss power transmission is enabled. The drive shaft 13, the transmission output shaft 12, and the planetary gear carrier 9 are formed in one piece with one another.

The coupling device (not shown) is separated in a fluid-conducting manner, in particular by the partition wall 21, from the chamber in which the electric motor/generator 2 and the planetary gear set 5 are arranged, in particular the coupling device can thus be designed as a dry-running coupling device, using which high torques are transmittable.

In this case, this embodiment of the invention is designed such that this coupling device does not have to provide a starting function and is therefore usable solely as a disconnection clutch.

A disconnection clutch structurally differs from a starting clutch in general, in particular by way of a reduced heat dissipation capacity. In a starting clutch, during the starting procedure (stationary vehicle is accelerated at least partially by way of internal combustion engine) planned slip occurs in the starting clutch, in particular of the friction linings. The amount of heat occurring due to this slip has to be able to be dissipated by the starting clutch. In a disconnection clutch, the operating phases having slip are reduced in relation to a starting clutch or do not occur at all, because of which a disconnection clutch is designed such that a smaller quantity of heat can be dissipated, in comparison to the starting clutch.

Figure 3:
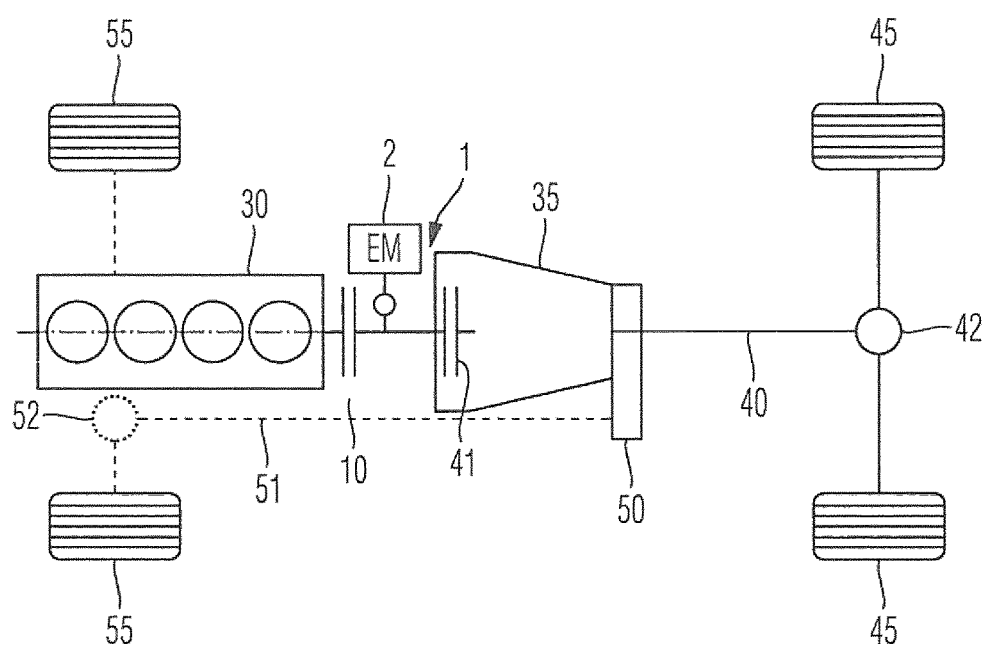
FIG. 3 is a schematic hybrid drive train.

FIG. 3 schematically shows a hybrid drive train. The hybrid drive train has an internal combustion engine 30 as a further drive machine. This further drive machine 30 is selectively connectable to the drive system 1 by the coupling device 10 for power transmission.

The drive power provided by the internal combustion engine 30 and/or the electric motor/generator 2 is supplied from the drive system 1 to the automatic transmission 35 via the further coupling device, designed as the starting clutch 41. The automatic transmission 35 outputs this drive power via the propeller shaft 40 and the rear axle differential 42 to the drivable wheels 45 of the rear axle.

The hybrid drive train is optionally designed as an all-wheel drive train. The optional components for this purpose are shown by dashed lines. In the all-wheel option, power can be emitted to the drivable front wheels 55 by way of an intermediate transmission 50, a propeller shaft 51, and a differential gear 52.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive system for a hybrid drive in a motor vehicle, comprising:
   a drive machine including a rotor and a stator;
   a planetary gear set including a sun gear, a ring gear, and at least one planetary gear mounted on a planetary gear carrier; and
   a coupling device via which at least one further drive machine is couplable to the drive system, wherein
   the ring gear is connectable to the rotor to transmit a drive power and is arranged in a radial direction inside the rotor,
   the sun gear is mounted in a rotationally-fixed manner in relation to the stator,
   the planetary gear carrier is configured as a transmission output shaft in one piece, and
   a drive shaft, which is arranged concentrically in relation to the ring gear, is connectable to the planetary gear carrier and to the coupling device.

2. The drive system according to claim 1, wherein
   the ring gear is connected in a rotationally-fixed manner to the rotor and
   the planetary gear carrier is rotatably mounted in relation to the ring gear.

3. The drive system according to claim 2, wherein the drive shaft is connected in a rotationally-fixed manner to the planetary gear carrier.

4. The drive system according to claim 1, wherein the drive shaft is connected in a rotationally-fixed manner to the planetary gear carrier.

5. The drive system according to claim 1, wherein the stator is accommodated in a housing module and is connected in a rotationally-fixed manner thereto.

6. The drive system according to claim 5, wherein the sun gear is connected in a rotationally-fixed manner to the housing module.

7. The drive system according to claim 6, wherein at least the ring gear, the sun gear, and at least the one planetary gear in the planetary gear set are arranged in an axial direction inside the rotor.

8. The drive system according to claim 7, wherein the coupling device is arranged radially inside the rotor.

9. The drive system according to claim 5, wherein the housing module is formed in one piece with a transmission housing for accommodating multiple shift transmission stages.

10. The drive system according to claim 6, wherein the housing module is formed in one piece with a transmission housing for accommodating multiple shift transmission stages.

11. The drive system according to claim 1, wherein at least the ring gear, the sun gear, and at least the one planetary gear in the planetary gear set are arranged in an axial direction inside the rotor.

12. The drive system according to claim 1, wherein the planetary gear set has a stand transmission ratio, the absolute value of which is greater than 1 and less than 2.5.

13. The drive system according to claim 12, wherein the absolute value of the stand transmission ratio is greater than 1.25 and less than 2.1.

14. The drive system according to claim 13, wherein the absolute value of the stand transmission ratio is greater than 1.5 and less than 1.8.

15. The drive system according to claim 1, wherein the coupling device is arranged radially inside the rotor.

16. The drive system according to claim 1, wherein at least one partial region for selective torque transmission of the coupling device is arranged in an axial direction inside the rotor or is covered by the rotor.

17. The drive system according to claim 16, wherein an entire region for selective torque transmission of the coupling device is arranged in an axial direction inside the rotor or is covered by the rotor.

18. A hybrid drive train comprising:
   a drive system according to claim 1;
   an internal combustion engine as a further drive machine, which is selectively connectable to the drive system;
   a shift transmission device which is connectable to the drive system; and
   at least one wheel tire of the vehicle drivable by one of the drive machines, wherein the shift transmission device is arranged downstream of the drive system with respect to torque transmission from the drive machine to the at least one wheel tire.

19. A hybrid drive train comprising:
a drive system for a hybrid drive in a motor vehicle, comprising:
   a drive machine including a rotor and a stator;
   a planetary gear set including a sun gear, a ring gear, and at least one planetary gear mounted on a planetary gear carrier; and
   a coupling device via which at least one further drive machine is couplable to the drive system, wherein
   the ring gear is connectable to the rotor to transmit a drive power and is arranged in a radial direction inside the rotor,
   the sun gear is mounted in a rotationally-fixed manner in relation to the stator,
   the planetary gear carrier is configured as a transmission output shaft, and
   a drive shaft, which is arranged concentrically in relation to the ring gear, is connectable to the planetary gear carrier and to the coupling device;
an internal combustion engine as a further drive machine, which is selectively connectable to the drive system;
a shift transmission device which is connectable to the drive system; and
at least one wheel tire of the vehicle drivable by one of the drive machines,
wherein the shift transmission device is arranged downstream of the drive system with respect to torque transmission from the drive machine to the at least one wheel tire, and
wherein the shift transmission device is an automatic or automated shifting transmission device and has at least one transmission planetary gear set.

20. A drive system for a hybrid drive in a motor vehicle, comprising:
   a drive machine including a rotor and a stator;
   a planetary gear set including a sun gear, a ring gear, and at least one planetary gear mounted on a planetary gear carrier; and
   a coupling device via which at least one further drive machine is couplable to the drive system, wherein
   the ring gear is connectable to the rotor to transmit a drive power and is arranged in a radial direction inside the rotor,
   the sun gear is mounted in a rotationally-fixed manner in relation to the stator,
   the planetary gear carrier is directly connectable to a transmission output shaft, and
   a drive shaft, which is arranged concentrically in relation to the ring gear, is connectable to the planetary gear carrier and to the coupling device.

* * * * *